United States Patent
Fischer et al.

(10) Patent No.: US 10,630,090 B2
(45) Date of Patent: Apr. 21, 2020

(54) RIPPLE CURRENT REDUCTION FOR WIRELESS ELECTRIC VEHICLE CHARGING

(71) Applicant: WiTricity Corporation, Watertown, MA (US)

(72) Inventors: Marcel Fischer, Boniswil (CH); Patrick Lattmann, Brugg (CH)

(73) Assignee: WiTricity Corporation, Watertown, MA (US)

( * ) Notice: Subject to any disclaimer, the term of this patent is extended or adjusted under 35 U.S.C. 154(b) by 435 days.

(21) Appl. No.: 15/709,314

(22) Filed: Sep. 19, 2017

(65) Prior Publication Data

US 2019/0089171 A1 Mar. 21, 2019

(51) Int. Cl.

| H01M 10/44 | (2006.01) |
| H01M 10/46 | (2006.01) |
| H02J 7/00 | (2006.01) |
| H02J 7/04 | (2006.01) |
| H02J 7/02 | (2016.01) |
| B60L 53/12 | (2019.01) |
| H02J 50/80 | (2016.01) |
| H02J 50/12 | (2016.01) |

(52) U.S. Cl.
CPC ............ *H02J 7/0029* (2013.01); *B60L 53/12* (2019.02); *H02J 7/0027* (2013.01); *H02J 7/025* (2013.01); *H02J 7/027* (2013.01); *H02J 7/04* (2013.01); *H02J 50/12* (2016.02); *H02J 50/80* (2016.02)

(58) Field of Classification Search
CPC .. H02J 5/005; H02J 7/025; H02J 50/12; H02J 50/20; H02J 50/80
USPC .................. 307/104; 320/107, 108, 140, 141
See application file for complete search history.

(56) References Cited

U.S. PATENT DOCUMENTS

| 9,118,357 | B2 | 8/2015 | Tseng | |
| 2004/0267501 | A1* | 12/2004 | Freed ...................... | H02J 50/12 702/184 |
| 2014/0225458 | A1* | 8/2014 | Rehm ..................... | H02J 50/70 307/149 |
| 2014/0306663 | A1 | 10/2014 | Ngo et al. | |

(Continued)

FOREIGN PATENT DOCUMENTS

| CN | 103384075 A | 11/2013 |
| WO | 2013136755 A1 | 9/2013 |

*Primary Examiner* — Edward Tso
(74) *Attorney, Agent, or Firm* — Colby Nipper PLLC

(57) ABSTRACT

The present disclosure describes aspects of ripple current reduction for wireless electric vehicle charging. In some aspects, an apparatus for wireless power transmission includes an inverter circuit to provide alternating current and a resonant circuit having a tuning portion and a coil portion to transmit power based on the alternating current. The apparatus also includes a current sensor to provide an indication of peak-to-peak amplitude (e.g., ripple current) of the alternating current that flows to the coil portion of the resonant circuit. Based on this indication, a control signal of the inverter is altered to adjust the peak-to-peak amplitude of the alternating current, such as to reduce ripple current in the coil portion. By so doing, ripple current can be reduced in power-transmitting or power-receiving devices, which may improve power transmission efficiency, enable use of smaller decoupling capacitors, or reduce stress on elements of respective resonant circuits.

30 Claims, 10 Drawing Sheets

(56) References Cited

U.S. PATENT DOCUMENTS

2015/0108847 A1\* 4/2015 Taylor .................... H02J 50/60
                                                                                    307/104
2016/0001662 A1    1/2016 Miller et al.
2016/0006356 A1    1/2016 Nirantare et al.

\* cited by examiner

```
                                    ┌─ 500
                                    ↙
┌─────────────────────────────────────────────────────────────┐
│   Transmit, to an Inverter, a Periodic Signal for Use by the │
│      Inverter to Invert DC Power to Alternating Current      │
│                            502                               │
└─────────────────────────────────────────────────────────────┘
                              │
                              ▼
┌─────────────────────────────────────────────────────────────┐
│  Receive, from a Current Sensor, an Indication of Peak-to-Peak│
│      Amplitude of the Alternating Current Flowing between    │
│     a Tuning Portion and a Coil Portion of a Resonant Circuit│
│                            504                               │
└─────────────────────────────────────────────────────────────┘
                              │
                              ▼
┌─────────────────────────────────────────────────────────────┐
│   Alter, Based on the Indication, the Periodic Signal to Adjust the│
│     Peak-to-Peak Amplitude of the Alternating Current Flowing │
│  between the Tuning Portion and Coil Portion of the Resonant Circuit│
│                            506                               │
└─────────────────────────────────────────────────────────────┘
```

FIG. 5

RIPPLE CURRENT REDUCTION FOR WIRELESS ELECTRIC VEHICLE CHARGING

FIELD OF THE DISCLOSURE

This disclosure relates generally to wireless power transfer systems, more specifically to managing characteristics of wireless power transmission.

BACKGROUND

In wireless power transfer systems, such as wireless charging systems, power is transferred, via e.g., magnetic resonance, from a primary coil of a transmitter to a secondary coil of a receiver. Generally, power is transferred by generating an alternating current flow in the primary coil, which causes a corresponding flow of alternating current in the secondary coil. To generate this alternating current flow in the primary coil, power is often drawn from a direct-current (DC) power source and applied to the primary coil.

Voltage of the DC power source from which the alternating current flow is generated, however, may fluctuate due to mains current frequency, power transfer levels, decoupling capacitance, or other factors. These voltage fluctuations often introduce ripple current in the primary coil, particularly in systems with a single phase AC source where ripple current can be significant. Being coupled to the primary coil, the ripple current is also transferred to the secondary coil where circuitry of the receiver, if passive, further amplifies the amplitude of the ripple current. Passing through circuitry of the receiver, this amplified ripple current can damage current-sensitive components of the receiver, such as batteries, which have specific ripple current limitations.

This description of related art is provided for the purpose of generally presenting a context for the disclosure that follows. Unless indicated otherwise herein, concepts described in this section are not prior art to this disclosure and are not admitted to be prior art by inclusion herein.

SUMMARY

In some aspects of ripple current reduction for wireless electric vehicle charging, an apparatus for wireless power transmission includes an inverter circuit to provide alternating current and a resonant circuit having a tuning portion and a coil portion to transmit power based on the alternating current. The apparatus also includes a current sensor to provide an indication of peak-to-peak amplitude (e.g., ripple current) of the alternating current that flows to the coil portion of the resonant circuit. Based on this indication, a control signal of the inverter is altered to adjust the peak-to-peak amplitude of the alternating current, such as to reduce ripple current in the coil portion of the resonant circuit. By so doing, ripple current can be reduced in power-transmitting or power-receiving devices, which may improve power transmission efficiency, enable use of smaller decoupling capacitors, or reduce stress on elements of respective resonant circuits.

In some aspects of ripple current reduction, an apparatus for wireless power transmission comprises a power input node configured to receive direct-current (DC) power and an inverter circuit having an input coupled to the power input node. The apparatus also includes a resonant circuit coupled to outputs of the inverter circuit, the resonant circuit including a tuning portion and a coil portion. The apparatus includes a current sensor coupled to the resonant circuit. A controller of the apparatus, coupled to the inverter circuit and the current sensor, and is configured to apply, to the inverter circuit, a periodic control signal for use by the inverter circuit to invert the DC power to alternating current. The controller is also configured to receive, from the current sensor, an indication of a peak-to-peak amplitude of the alternating current that flows to the coil portion of the resonant circuit. Based on the indication, the controller can alter the periodic control signal to adjust the peak-to-peak amplitude of the alternating current that flows between the tuning portion and the coil portion of the resonant circuit.

In some cases, altering the periodic control signal to adjust the peak-to-peak amplitude of the alternating current is effective to reduce the peak-to-peak amplitude of the alternating current. The peak-to-peak amplitude of the alternating current that flows into the coil portion of the resonant circuit may correspond to ripple current, and altering the periodic control signal can be effective to reduce an amplitude of the ripple current that flows into the coil portion of the resonant circuit. The controller may be further configured to sample, based on the periodic control signal, the indication of the peak-to-peak amplitude to measure the peak-to-peak amplitude of the alternating current. In such cases, the controller can compare the measured peak-to-peak amplitude of the alternating current with a predefined threshold for the peak-to-peak amplitude of the alternating current and alter, responsive to the measured peak-to-peak amplitude exceeding the predefined threshold, the periodic control signal to reduce the measured peak-to-peak amplitude of the alternating current below the predefined threshold.

Alternately or additionally, applying the periodic control signal to the inverter circuit can cause the inverter circuit to invert the DC power to the alternating current at a first frequency and the peak-to-peak amplitude of the alternating current may correspond to a second frequency that is different from the first frequency. For example, the first frequency at which the inverter circuit inverts the alternating current can be greater than 20 kHz and the second frequency to which the peak-to-peak amplitude corresponds may be less than 400 Hz.

The apparatus may also comprise a DC blocking circuit coupled between the outputs of the inverter circuit and the resonant circuit of the apparatus, or a coil switch circuit coupled between the outputs of the inverter circuit and the resonant circuit of the apparatus. In some cases, the apparatus comprises signal conditioning circuitry coupled between an input the controller and an output of the current sensor that includes an amplifier, a rectifier, or a low-pass filter. The signal conditioning circuitry of the apparatus may include the amplifier, the rectifier, and the low-pass filter.

In other aspects, a system for wirelessly transmitting power comprises a DC power source configured to convert alternating-current (AC) power of a first frequency to DC power. An inverter circuit of the system is coupled to the DC power source and is configured to invert, based on a pulse-width modulation (PWM) control signal, the DC power to alternating current of a second frequency that is different from the first frequency. A resonant circuit of the system is coupled to the inverter circuit and has a tuning portion and a coil configured to wirelessly transmit, based on the alternating current, power to another resonant circuit of a power-receiving device. The system also includes a current sensor and a controller configured to receive, from the current sensor, an indication of the alternating current flowing to the coil of the resonant circuit. The controller is also configured to determine, based on the indication, an amount of the alternating current flowing to the coil at a third frequency, the third frequency being less than one half of the second frequency. Based on the determined amplitude, the controller is configured to alter the PWM signal of the inverter circuit to reduce the amount of the alternating current flowing to the coil at the third frequency.

The third frequency at which the amount of alternating current flows to the coil can be approximately twice the first frequency of the AC power. The controller of the system may be further configured to measure, based on the PWM control signal, an amplitude of the indication to determine the amount of the alternating current flowing to the coil at the third frequency. Measuring the amplitude of the indication can include determining a time at which to measure the amplitude of the indication based on a transition of the PWM control signal.

The alternating current flowing to the coil of the resonant circuit at the third frequency may be ripple current of the DC power of the DC power source. In some cases, the system further comprises signal conditioning circuitry coupled between the current sensor and the controller of the system. In such cases, the signal conditioning circuitry may include an amplifier, a rectifier, or a low-pass filter. Alternately or additionally, the signal conditioning circuitry can include a variable-gain amplifier, an active rectifier, or an active low-pass filter. The DC power source of the system can convert AC power of a frequency of less than 100 Hz. The second frequency of the alternating current provided by the inverter circuit can be greater than 60 kHz and the third frequency at which the alternating current flows into the coil may be less than 30 kHz. The system can be implemented as part of a wireless electric vehicle charging (WEVC) system, a bi-polar WEVC system; or a dual coil WEVC system.

In yet other aspects, a method for wireless power transmission comprises receiving DC power and applying, to an inverter circuit, a periodic control signal used by the inverter circuit to invert the DC power to provide alternating current. The method also includes applying the alternating current provided by the inverter circuit to a resonant circuit that includes a tuning portion and a coil portion, and receiving, from a current sensor, an indication of peak-to-peak amplitude of the alternating current flowing to the coil portion of the resonant circuit. Based on the indication, the method alters the periodic control signal to adjust the peak-to-peak amplitude of the alternating current flowing to the coil portion of the resonant circuit.

The periodic control signal may be a PWM control signal and altering the periodic control signal can include altering a duty-cycle of the PWM control signal. In some cases, the method further comprises determining, based on the periodic control signal, a time at which to sample the peak-to-peak amplitude of the alternating current. In such cases, the method may sample, at the determined time, the indication of the peak-to-peak amplitude of the alternating current to provide a sample of the indication, and alter, based on the sample of the indication, the periodic control signal to adjust the peak-to-peak amplitude of the alternating current flowing to the coil portion of the resonant circuit.

Alternately or additionally, the method may compare the sample of the indication with a predefined threshold for the peak-to-peak amplitude of the alternating current, and alter, responsive to the sample of the indication exceeding the predefined threshold, the periodic control signal to reduce the peak-to-peak amplitude of the alternating current. The indication of the peak-to-peak amplitude of the alternating current can be an analog signal, and the method may further comprise, prior to the sampling, amplifying the analog signal, rectifying the analog signal, or filtering the analog signal. In some cases, applying the periodic control signal to the inverter circuit causes the inverter circuit to invert the DC power to the alternating current at a first frequency and the peak-to-peak amplitude of the alternating current corresponds to a second frequency that is different from the first frequency.

In some aspects, an apparatus for wireless power transmission comprises a power input node configured to receive DC power and an inverter circuit having an input coupled to the power input node. A resonant circuit of the apparatus is coupled to outputs of the inverter circuit and has a tuning portion and a coil portion. The apparatus includes means for applying, to the inverter circuit, a periodic control signal for use by the inverter circuit to invert the DC power to alternating current. The apparatus also comprises means for sensing the alternating current that flows to the coil portion of the resonant circuit and means for determining, based on the sensed alternating current, a peak-to-peak amplitude of the alternating current that flows to the coil portion of the resonant circuit. The apparatus includes means for altering, based on the peak-to-peak amplitude of the alternating current, the periodic control signal to adjust the peak-to-peak amplitude of the alternating current that flows to the coil portion of the resonant circuit.

The periodic control signal may a PWM control signal, and the apparatus can include means for generating the PWM control signal and means for altering a duty-cycle of the PWM control signal. In some cases, the apparatus includes means for sampling, based on the periodic control signal, an indication of the alternating current provided by the means for sensing the alternating current. Alternately or additionally, the means for determining the peak-to-peak amplitude further include means for amplifying a signal indicative of the peak-to-peak amplitude, means for rectifying the signal indicative of the peak-to-peak amplitude, means for filtering the signal indicative of the peak-to-peak amplitude, or means for converting the signal indicative of the peak-to-peak amplitude to a digital representation.

The foregoing summary is provided to briefly introduce some of the aspects described herein. This summary is not intended to identify key or essential features of these or other aspects that are further described throughout the disclosure.

BRIEF DESCRIPTION OF DRAWINGS

The details of various aspects are set forth in the accompanying figures and the detailed description that follows. In the figures, the left-most digit of a reference number identifies the figure in which the reference number first appears. The use of the same reference numbers in different instances in the description or the figures indicates like elements:

FIG. 5 illustrates an example method for adjusting a peak-to-peak amplitude of alternating current.

DETAILED DESCRIPTION

Figure 1:
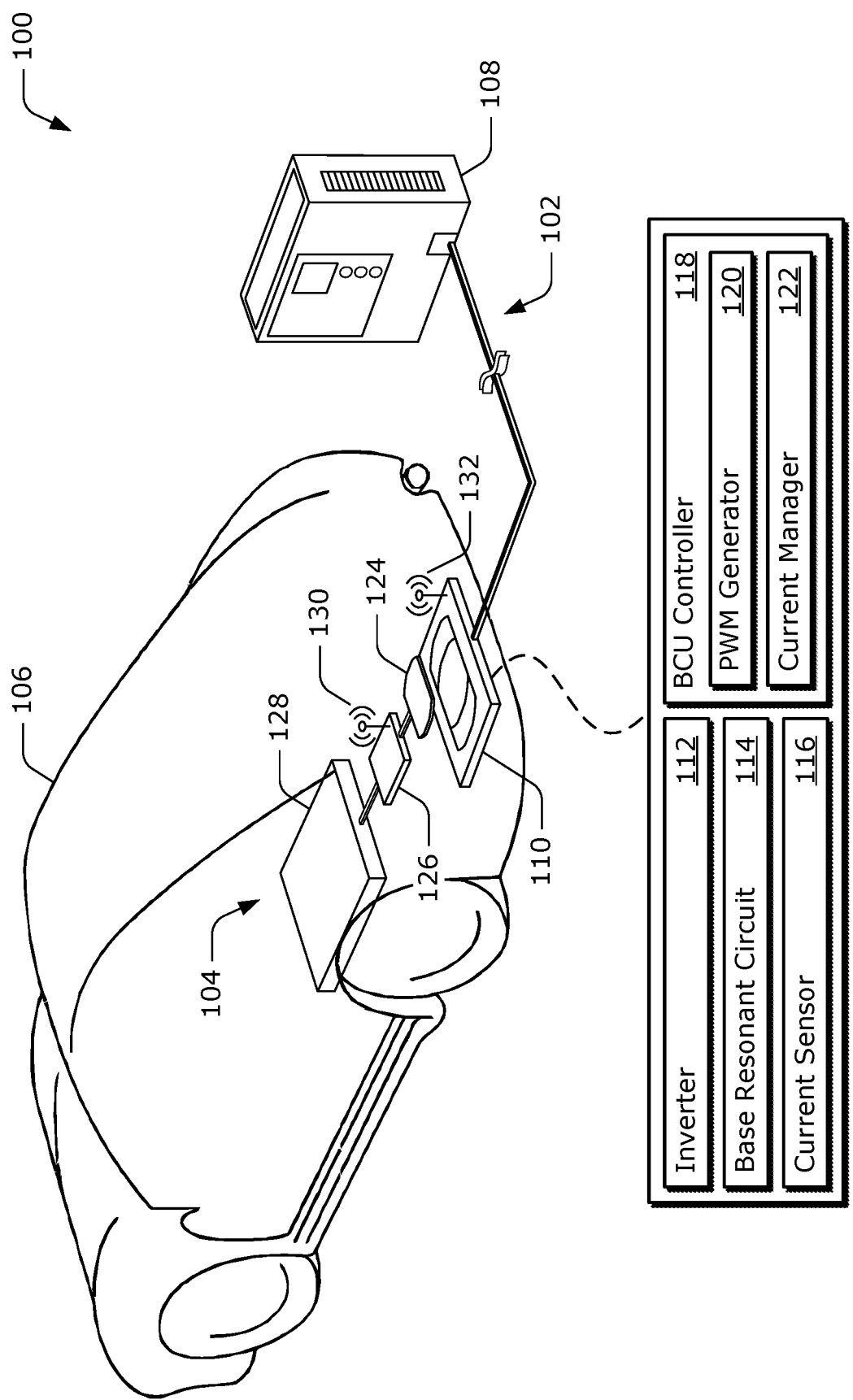
FIG. 1 illustrates an example environment that includes a wireless charging in which aspects of ripple current reduction can be implemented.

Performance of wireless charging systems may be limited or impaired by ripple current related to a direct-current (DC) power source or DC power link of the system. Generally, the ripple current corresponds to ripple voltage caused by the rectification of low frequency alternating-current (AC) power, particularly single-phase AC power. When rectified, single-phase AC power can cause significant ripple voltage at approximately twice a frequency of the single-phase AC power (e.g., for full-wave rectifiers). For example, a single-phase AC power converter or power factor correction (PFC) unit may provide DC power with ripple voltage of approximately 25% of a voltage at which the DC power is provided. In other words, DC power provided by a DC power link at 400 Volts may also include ripple voltage of approximately 100 Volts superimposed on the DC voltage.

When inverted by an inverter to provide a higher frequency AC waveform for power transmission, this low frequency ripple voltage of the DC power link introduces corresponding ripple current on the higher frequency AC waveform. Typically, an amplitude of the ripple current corresponds to that of the ripple voltage, such that the ripple current on the AC waveform may also be approximately 25% of root mean square (RMS) current applied to a primary coil of a wireless power transmitter. When the primary coil is coupled to a secondary coil that receives power, the ripple current is transferred to the secondary coil and associated circuitry of a wireless power receiver, where passive circuitry may further amplify ripple current. Passing through circuitry of the receiver, this amplified ripple current can damage current-sensitive components of the receiver, such as batteries, which have specific ripple current limitations. To address these and other ripple current issues, techniques may include adding significant decoupling capacitance to an output of the DC power link or PAC unit to smooth or soften the voltage ripple. Adding enough capacitance to address the ripple current, however, may be expensive and require significant space.

This disclosure describes aspects of ripple current reduction for wireless electric vehicle charging (WEVC), which may enable adjustment or reduction of ripple current without the addition of significant decoupling capacitance. In some aspects of ripple current reduction, an apparatus for wireless power transmission includes an inverter circuit to provide alternating current from a DC power source and a resonant circuit having a tuning portion and a coil portion to transmit power based on the alternating current. The apparatus also includes a current sensor to provide an indication of peak-to-peak amplitude (e.g., ripple current) of the alternating current that flows between the tuning portion and coil portion of the resonant circuit. Based on this indication, a control signal of the inverter is altered to adjust the peak-to-peak amplitude of the alternating current, such as to reduce ripple current applied or flowing into the coil portion of the resonant circuit. By so doing, ripple current can be reduced in power-transmitting or power-receiving devices, which may improve an overall power transmission efficiency, enable use of smaller decoupling capacitors, or reduce stress on elements of respective resonant circuits of the devices.

These and other aspects of ripple current reduction are described below in the context of an example environment, example component configurations, and example techniques. Any reference made with respect to the example environment or components configurations, or elements thereof, is by way of example only and is not intended to limit any of the aspects described herein.

Example Environment

FIG. 1 illustrates an example environment in which a wireless charging system 100 is implemented in accordance with one or more aspects. The wireless charging system 100 includes a wireless power transmitter 102 and a wireless power receiver 104. In this particular example, the wireless power receiver 104 is embodied in an electric vehicle 106 and the wireless charging system 100 is implemented as a wireless electric vehicle charging (WEVC) system. Although described with reference to an electric or hybrid vehicle, the wireless charging system 100 may be implemented or scaled to transfer power to any suitable receiver, such as a smart-phone, laptop computer, tablet computer, home appliance, rail vehicle (e.g., train or subway), power utility or grid device, solar power device, and the like.

The wireless power transmitter 102 includes or is coupled to a direct-current (DC) power source 108 and a base charging unit 110 (e.g., charging pad) that is coupled to the DC power source 108. The DC power source 108 may provide DC power to the base charging unit 110 at any suitable voltage, such as from 100 Volts DC (VDC) to 1000 VDC. In some cases, the DC power source 108 includes circuitry for rectification, filtering, or power factor correction (PAC) of AC power received from household or commercial AC mains at approximately 50 Hz to 60 Hz, or less than 100 Hz. In such cases, DC power provided by the DC power source 108 may include ripple voltage of approximately 100 Hz to 120 Hz, or less than 400 Hz (e.g., poly-phase systems). Alternately or additionally, the DC power source 108 may provide power to multiple base charging units, directly or through a common power bus that connects the multiple base charging units.

The base charging unit 110 includes an inverter 112, a base resonant circuit 114 (e.g., primary tank circuit), a current sensor 116, and a base unit charging controller 118 (BCU controller 118). Although shown embodied in the base charging unit 110, each of these entities may be implemented separate from the base charging unit 110 as individual components or combined with others, such as with the DC power source 108. The inverter 112 inverts the DC power provided by the DC power source 108 to higher frequency (e.g., 20 kHz-120 kHz) alternating current for driving the base resonant circuit 114 to transmit power. The inverter 112 may include any suitable type of inverting circuitry, such as an H-bridge of switches coupled from the DC power source 108 to the base resonant circuit 114. In some cases, the switches of the H-bridge or other components of the inverter 112 are controlled or driven by a pulse-width modulation (PWM) generator 120 of the BCU controller 118.

The base resonant circuit 114 includes tuning circuitry and a coil that may be configured to resonate at a particular frequency to generate a time-varying magnetic field. In some cases, this magnetic field generated by the alternating current flowing in the base resonant circuit 114 facilitates coupling with a receiving coil or secondary coil of a power-receiving device. Generally, the inverter 112 provides the alternating current or AC power at or near a resonant frequency of the base resonant circuit 114 to facilitate wireless transmission of power. In some aspects, the current sensor 116 of the base charging unit 110 is coupled between the tuning circuitry and coil of the base resonant circuit. As such, the current sensor 116 may provide an indication of the alternating current flowing in the coil to a ripple current manager circuit 122 (current manager circuit 122) of the BCU controller 118. The implementations and uses of the current manager circuit 122 vary, and are described further herein.

In the context of the wireless charging system 100, the base charging unit 110 transmits power via the time-varying magnetic field from the base resonant circuit 114 to a receiver coil 124 (e.g., secondary coil) of the wireless power receiver 104, which in this example is coupled to a vehicle charging unit 126. The base resonant circuit 114 and a receiver resonant circuit (not shown) coupled to the receiver coil 124 may be configured according to a mutual resonant relationship. As such, alternating current may be induced to flow in the receiver resonant circuit based on the time-varying magnetic field generated by the alternating current flowing in the base resonant circuit 114 of the base charging unit 110. Transmission losses between the respective resonant circuits may be reduced by tuning or matching a resonant frequency of the base resonant circuit 114 to that of the receiver resonant circuit.

In some aspects, the vehicle charging unit 126 of the wireless power receiver 104 rectifies the alternating current flow induced in the receiver coil to provide DC power to charge a battery 128 of the electric vehicle 106. Due to mutual coupling, the alternating current in the receiver resonant circuit may also include ripple current that corresponds to ripple current flowing in the base resonant circuit 114. As such, the current manager circuit 122 may adjust or reduce the ripple current in the base resonant circuit 114 based on current ripple specifications of components of the wireless power receiver 104 (e.g., battery or capacitor). In some aspects, the ripple current may also be controlled based on a gain factor related to the mutual coupling between the base resonant circuit 114 and receiver resonant circuit, or gain provided by passive circuitry of the wireless power receiver 104.

The vehicle charging unit 126 of the wireless power receiver 104 may also include a wireless interface 130 configured to establish a communication link with a wireless interface 132 of the base charging unit 110. The vehicle charging unit 126 and base charging unit 110 can communicate to exchange any suitable information, such as respective coil configurations, coil power ratings, vehicle alignment or positioning information, current levels (e.g., $A_{RMS}$ or $A_{P-P}$), charging status, fault states, a status of the battery 128, and the like. The communication link may be implemented through one or more wireless networks, such as a wireless local-area-network, peer-to-peer (P2P) network, cellular network, and/or wireless personal-area-network (WPAN).

Figure 2:
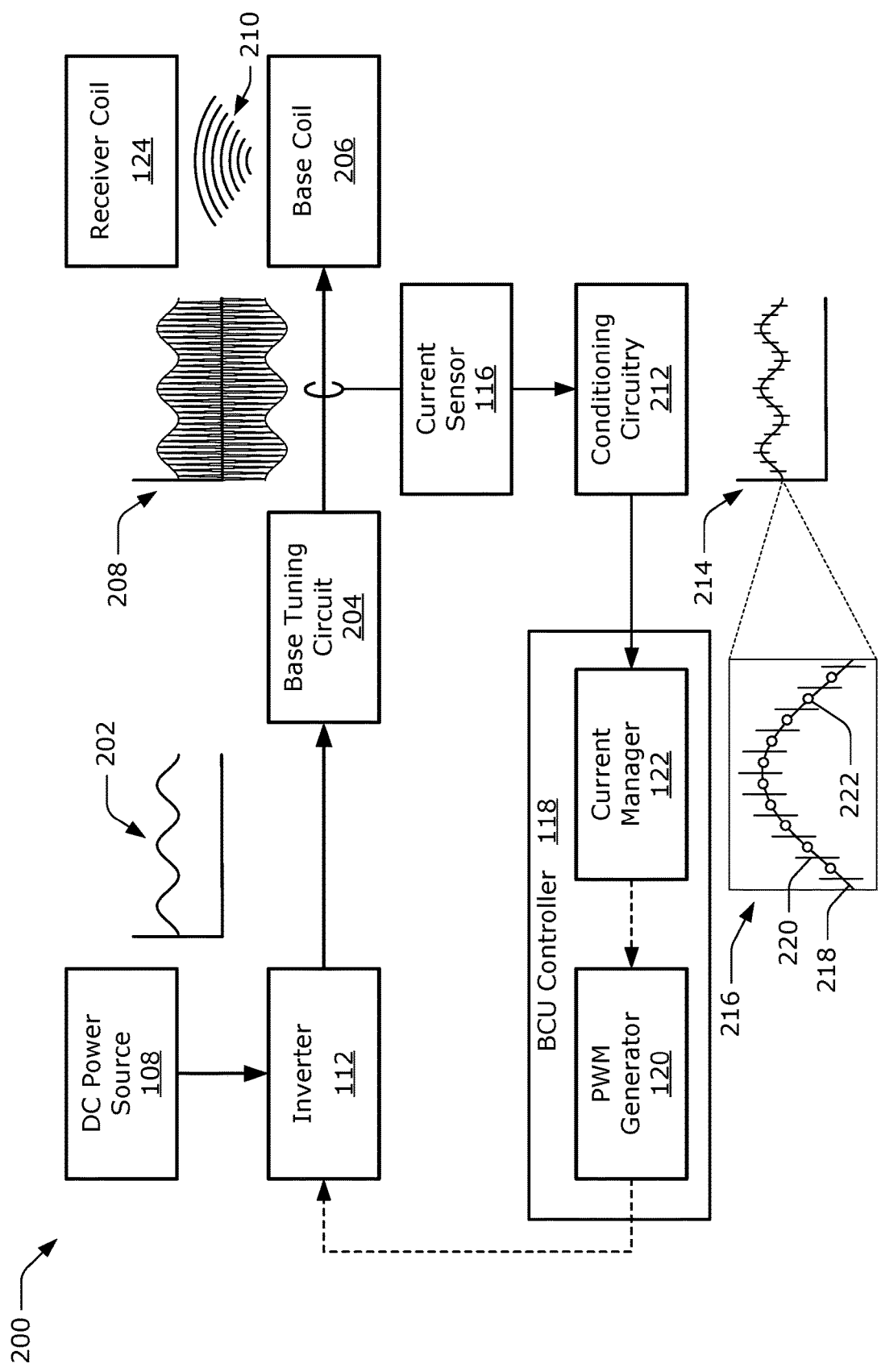
FIG. 2 illustrates an example configuration of a base charging unit that includes a current sensor and a current manager circuit.

FIG. 2 illustrates an example configuration of a base charging unit capable of implementing ripple current reduction at 200. In this particular example, the DC power source 108 is coupled to an input of the inverter 112 and provides DC power to the inverter 112. As shown at 202, the DC power includes ripple voltage, such as from rectification, that manifests as a low frequency (e.g., 100 Hz to 120 Hz) peak-to-peak ripple that is offset by or superimposed on a DC voltage level of the DC power. The inverter 112 is coupled to a base resonant circuit, which in this example includes a base tuning circuit 204 and base coil 206 that are configurable to resonate over a particular frequency range (e.g., 81.3 kHz to 90 kHz) to facilitate transmission of power to the receiver coil 124.

Based on the DC power, the inverter 112 provides alternating current to the base resonant circuit at a higher frequency (e.g., 85 kHz) as shown at 208. Here, note that respective peak-to-peak amplitudes of positive and negative portions of the AC current waveform correspond to the ripple voltage of the DC power as shown at 202. In other words, the inverter 112 inverts not only the DC voltage of the DC power, but also inverts the ripple voltage of the DC power source 108 to corresponding ripple current on the AC current waveform that is applied to the base resonant circuit.

The alternating current provided by the inverter may resonate in the base tuning circuit 204 and the base coil 206 to generate a time-varying magnetic (or electromagnetic) field 210. In this example, the base coil 206 uses the time-varying magnetic field 210 to transmit power to the receiver coil 124 of the vehicle charging unit 126. The time-varying magnetic field 210 may be generated in accordance with various spectrum allocations or safety guidelines, such as within a frequency band of 81.3 kHz to 90 kHz.

From the perspective of the wireless power receiver 104, current flow induced in the receiver coil 124 corresponds to the alternating current flowing in the base coil 206. As such, alternating current flowing in the receiver coil 124 may also include ripple current that corresponds to the ripple current in the base resonant circuit. In some cases, the wireless power receiver 104 may transmit an indication of the ripple current or a ripple current limit to the BCU controller 118. In such cases, this may enable the current manager circuit 122 to ensure that ripple current in the base coil 206, and thus the corresponding ripple current in the receiver coil 124, is managed to prevent the ripple current from exceeding specified limits or prevent components (e.g., a battery or capacitor) of the wireless power receiver 104 from being damaged.

In this example, the current sensor 116 is coupled between the base tuning circuit 204 and the base coil 206 of the base resonant circuit 114. The current sensor 116 may be implemented as any suitable type of current sensor, such as an inductive current sensor, a current sensing transformer, a current transducer, and the like. The current sensor 116 can sense or infer an amount of current flowing into the base coil 206 or an amount of current flowing between the base tuning circuit 204 and the base coil 206. In some cases, the amount of current sensed includes a level or amplitude of current from which respective RMS current and peak-to-peak current levels can be determined. For example, the current sensor may generate an indication (e.g., analog signal) of the current similar to the current waveform shown at 208 that includes respective RMS current and ripple current (e.g., peak-to-peak) amplitudes. Alternately or additionally, an amount or amplitude of ripple current may be quantified as a ratio of an RMS value of the current to an absolute value of the current.

The current sensor 116 can be coupled to signal conditioning circuitry 212 (conditioning circuitry 212), which may include any suitable type of amplification, rectification, or filtering circuitry. The conditioning circuitry 212 can scale, rectify, and filter a voltage signal or current signal generated by the current sensor 116 to provide a DC signal representative of amplitude of current flowing in the base coil 206. By way of example and as shown at 216, a DC signal indicating the amplitude of current may also indicate ripple current flowing in the base coil 206 and noise associated with switching activities of the inverter 112. An output of the conditioning circuitry 212 can be coupled to the BCU controller 118 or the current manager circuit 122, to which conditioned signals may be transmitted for sampling or processing (e.g., digital filtering).

In some aspects, the current manager circuit 122 measures or determines an amount of ripple current that flows in the base coil 206 based on an indication or signal provided by the current sensor 116. In some cases, the current manager circuit 122 samples or measures an amplitude of the current based on a periodic control signal that drives the inverter 112, switching transitions of the inverter 112, and the like. For example, the current manager circuit 122 may time samples of a signal provided by the conditioning circuitry 212 based on transitions of a PWM signal generated by the PWM generator 120 that controls switches of the inverter 112. This can be effective to avoid sampling noise or ringing associated with the inverter 112, which may be 20 to 50 times greater than typical background noise.

By way of example and as shown at 216, a DC signal 218 output by the conditioning circuitry 212 often includes switch-noise 220, which may occur at regular or irregular intervals (e.g., approximately every 1.5 microseconds) depending on switching activity of the inverter 112. Based on this switching activity or drive signals of the inverter 112, however, the current manager circuit 122 may determine sampling windows 222 (e.g., 10 kHz sample rate) to avoid switching activity of the inverter 112 and associated switching noise. In some cases, a sampling window includes a duration of time that starts after a switching event, including a predefined delay to allow the switch noise to settle, and ends before a next switching event disrupts the DC signal.

Based on an amount or amplitude of the ripple current, the current manager circuit 122 may alter a periodic control signal that controls the inverter 112. In the context of the example base charging unit, the current manager circuit 122 can alter a duty-cycle of a PWM signal transmitted by the PWM generator 120 to the inverter 112. In some cases, altering the duty-cycle of the PWM signal that controls the inverter 112 is effective to reduce the ripple current of the alternating current (e.g., AC current waveform 208) that flows in the base resonant circuit 114. For example, a duty-cycle of PWM pulses associated with inverting the DC power near peaks of the ripple voltage may be reduced (e.g., reduce switch on-time) such that an amplitude of the corresponding ripple current is reduced. These are but one use of the current manager circuit 122, others of which are described throughout this disclosure.

Figure 3:
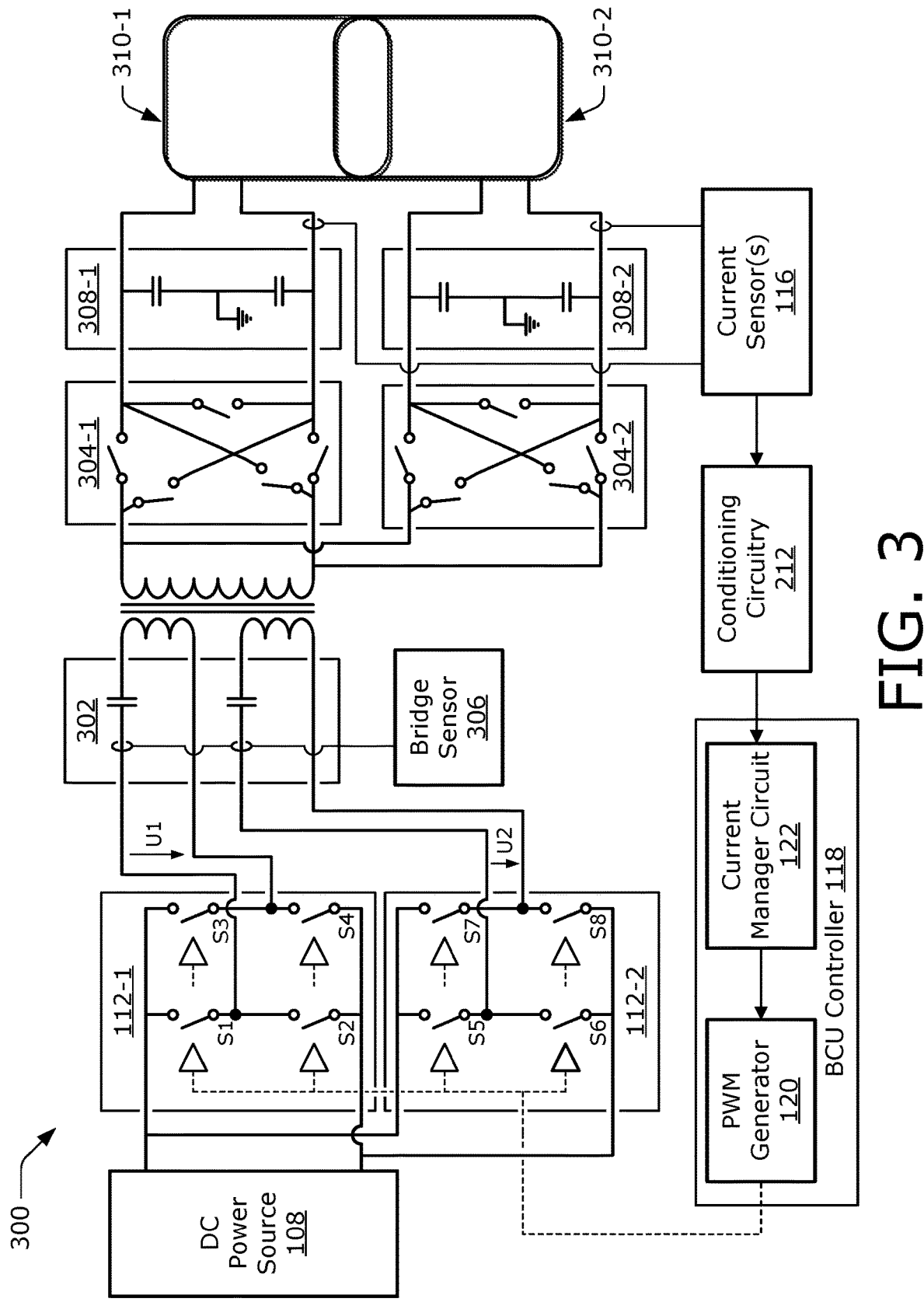
FIG. 3 illustrates example circuitry of a base charging unit in accordance with one or more aspects.

FIG. 3 illustrates an example circuitry of a base charging unit generally at 300. The illustrated base charging unit may be implemented similar to or differently from the base charging units described with reference to FIGS. 1 and 2. In this example, the base charging unit is implemented as a dual coil or bi-polar wireless power transmitter with two coils configured to transmit power. The base charging unit may be configurable or support multiple modes of operation such that the coils and associated circuitry can transmit power separately or combined.

Although shown as being implemented with particular types of an inverter, resonant circuits, coils, sensors, or switching components, aspects of ripple current reduction can be implemented with any suitable combination of tuning, coil, and sensing structures to facilitate ripple current reduction or management. Alternately or additionally, aspects of ripple current reduction may also be implemented in secondary resonant circuits, such as those of a wireless power receiver.

Further, signal- or current-carrying structures of the circuits (or other illustrative figures) may be implemented as any suitable type of conductor, such as wires, printed-circuit board (PCB) traces, etched metal layers, planes, contacts, nodes, terminals, nets, paths, rails, and the like. Any coupling or connection between components are also shown and described as example only, and may be direct or include other elements interposed between the coupled components. As such, the use of these terms in the disclosure is not meant to limit a configuration of any circuit, but to provide context for describing the circuits of the accompanying figures.

In this example, the base charging unit includes a DC power source 108 having power output nodes coupled to respective power input nodes of inverters 112-1 and 112-2, which are configured as full-bridge inverters or a dual full-bridge inverter. In some cases, the DC power source 108 is implemented separately from the base charging unit. In such cases, the DC power source 108 may be coupled to the base charging unit by a cord or cable assembly that carries the DC power to the base charging unit. Alternately or additionally, the cord or cable assembly can facilitate communication of data between the DC power source 108 and the base charging unit, such as to adjust a voltage at which the DC power is provided to the base charging unit.

As shown in FIG. 3, each of the inverters 112-1 and 112-2 includes an input rail connected to the DC power source 108 and outputs (e.g., U1 and U2) connected to a DC blocking component 302 (e.g., DC blocking circuit). Although shown as being implemented with full H-bridges, the inverters 112-1 and 112-2 may be implemented with half H-bridges or other switch topologies. The inverters 112-1 and 112-2 may be implemented with any suitable type or combination of switch devices, such as bipolar-junction transistors (BJTs), isolated-gate bipolar transistors (IGBTs), reverse-blocking IGBTs (RB-IGBTs), metal-oxide-semiconductor field-effect transistors (MOSFETs), silicon carbide (SiC) MOSFETs, and the like.

Generally, switch devices of the inverter 112-1 (e.g., switch 1 though switch 4 (S1-S4)) and switch devices of the inverter 112-2 (e.g., switch 5 though switch 8 (S5-S8)), are controlled or driven by the PWM generator 120 of the base charging unit. For example and with reference to the H-bridge of inverter 112-1, a first pair of the switch devices S1 and S4 can activated (e.g., closed) to connect the output (e.g., U1) of the inverter 112-1 to a positive DC voltage and another output of the inverter 112-1 to a lower potential or ground effective to cause current to flow through one of the current tracks to the DC blocking component 302. Deactivating (e.g., opening) the first pair of switch devices (e.g., S1, S4) and activating a second pair of the switch devices (e.g., S2, S3) to connect the other output of the inverter 112-1 to the positive DC voltage and the output of the inverter 112-1 to the lower potential or ground causes the current to flow through the current track in the opposite direction.

Accordingly, applying a PWM signal to each pair of the switches may cause the inverter 112 to provide alternating current from the DC power. In this example, four PWM signals can be used to respectively drive the dual H-bridges of the inverters 112-1 and 112-2 to independently control two channels of alternating current that are provided to the DC blocking component 302 or other downstream components of the base charging unit.

Each current track of the DC blocking component 302 may include a series capacitor and a connection to a transformer by which alternating current is passed to a coil switch circuit 304. In some cases, the DC blocking component 302 also includes a bridge current sensor 306 (bridge sensor 306) that enable the BCU controller 118 to monitor respective current flowing in each H-bridge. In such cases, the BCU controller 118 or current manager circuit 122 may alter, based on an indication of track current, operation of the H-bridges to manage characteristics (e.g., phase or amplitude) of the alternating current provided by the inverter 112.

The coil switches 304-1 and 304-2 enable configuration of the connections between the DC blocking component 302 and tuning circuits 308-1 and 308-2. For example, the coil switch 304-1 may provide a direct or an inverse connection between outputs of the DC blocking component 302 and the tuning circuits 308 to control a direction of current flow to a base coil 310-1. In some cases, the coil switches 304-1 and 304-2 enable the base charging unit to operate the bi-polar base coils 310-1 and 310-2 in multiple different power transmission modes, such as a circular mode, single coil mode, or double-D mode (DD mode) depending on relative current flow between the coils or individual coil activity. Alternately or additionally, the coil switches 304-1 or 304-2 may be used to short one or both of the base coils 310-1 and 310-2 depending on a power transmit mode or when not in use (e.g., single coil mode).

In this example, the tuning circuits 308-1 and 308-2 are implemented as shunt capacitive tuning networks, though any suitable type of tuning network may be used such as inductor-capacitor (LC) network, inductor-capacitor-inductor (LCL) network, and the like. As noted, the base coils 310-1 and 310-2 can be used to implement multiple different power transmission modes and may be configured similarly or differently from each other. Alternately or additionally, the base coils 310-1 and 310-2 can include or be embodied on a ferrite backer or ferrite plate to increase coupling or power transfer efficiency.

With reference to the dual base coils, an instance of the current sensor 116 is coupled between the tuning circuit 308-1 and the base coil 310-1 of a first resonant circuit of the base charging unit. The current sensor 116 is also coupled between the tuning circuit 308-2 and the base coil 310-2 of a second resonant circuit of the base charging unit. As such, the current sensor 116 may independently sense current flowing in either or both of the base coils 310-1 and 310-2. Although shown as one component, the current sensor 116 may be implemented as two separate current sensors coupled between the tuning circuit 308-1 and base coil 310-1 of the first resonant circuit, and the tuning circuit 308-2 and base coil 310-2 of the second resonant circuit, respectively. Alternately or additionally, a current sensor can be coupled between other components, such as between the DC blocking component 302 and a coil switch 304, or between a coil switch 304 and a tuning circuit 308.

An output or outputs of the current sensor 116 are coupled to signal conditioning circuitry 212 (conditioning circuitry 212), though the current sensor 116 may alternately be coupled directly to the current manager circuit 122. Generally, the conditioning circuitry 212 may scale, rectify, or filter a voltage-based signal or current-based signal generated by the current sensor 116 to provide a signal representative of respective current flowing in the base coil 310-1 or the base coil 310-2. An output or outputs (e.g., for dual coil systems) of the conditioning circuitry 212 may be coupled the current manager circuit 122, such as by an analog-to-digital input at which the output signal is sampled. Alternately or additionally, the current manager circuit 122 may process the signal or indication of the alternating current (e.g., digital filtering) to determine an RMS value or an amount of ripple current in the alternating current in a respective base coil.

In some aspects, the current manager circuit 122 measures or determines an amount of ripple current that flows in the base coil 206 based on an indication or the signal provided by the current sensor 116. The current manager circuit 122 may sample or measure an amplitude of the current based on a PWM signal that drives the inverters 112-1 and 112-2, switching transitions of the inverters 112-1 and 112-2, and the like. For example, the current manager circuit 122 may time sampling of the output of the conditioning circuitry 212 based on transitions of a signal generated by the PWM generator 120, such as a control signal used to drive switch devices of the inverter 112-1 or the inverter 112-2. By so doing, noise or ringing associated with switching of the inverters 112-1 and 112-2 can be avoided during the sampling and measurement of the ripple current.

Based on an amount, amplitude, or other quantification of the ripple current flowing in one of the base coils 310-1 or 310-2, the current manager circuit 122 may alter a periodic control signal or PWM signal that drives the inverters 112-1 and 112-2. The current manager circuit 122 can alter a duty-cycle of a PWM signal transmitted by the PWM generator 120 to drive either or both phases of the dual full-bridge inverter. In some cases, altering the duty-cycle of the PWM signal that controls the inverters 112-1 and 112-2 is effective to reduce the ripple current of the alternating current that flows in the base coil 310-1 or the base coil 310-2. A duty-cycle of PWM pulses associated with inverting the DC power near peaks of the ripple voltage may also be reduced (e.g., reduce switch on-time) such that an amplitude of the corresponding ripple current on the inverted alternating current is reduced.

Figure 4:
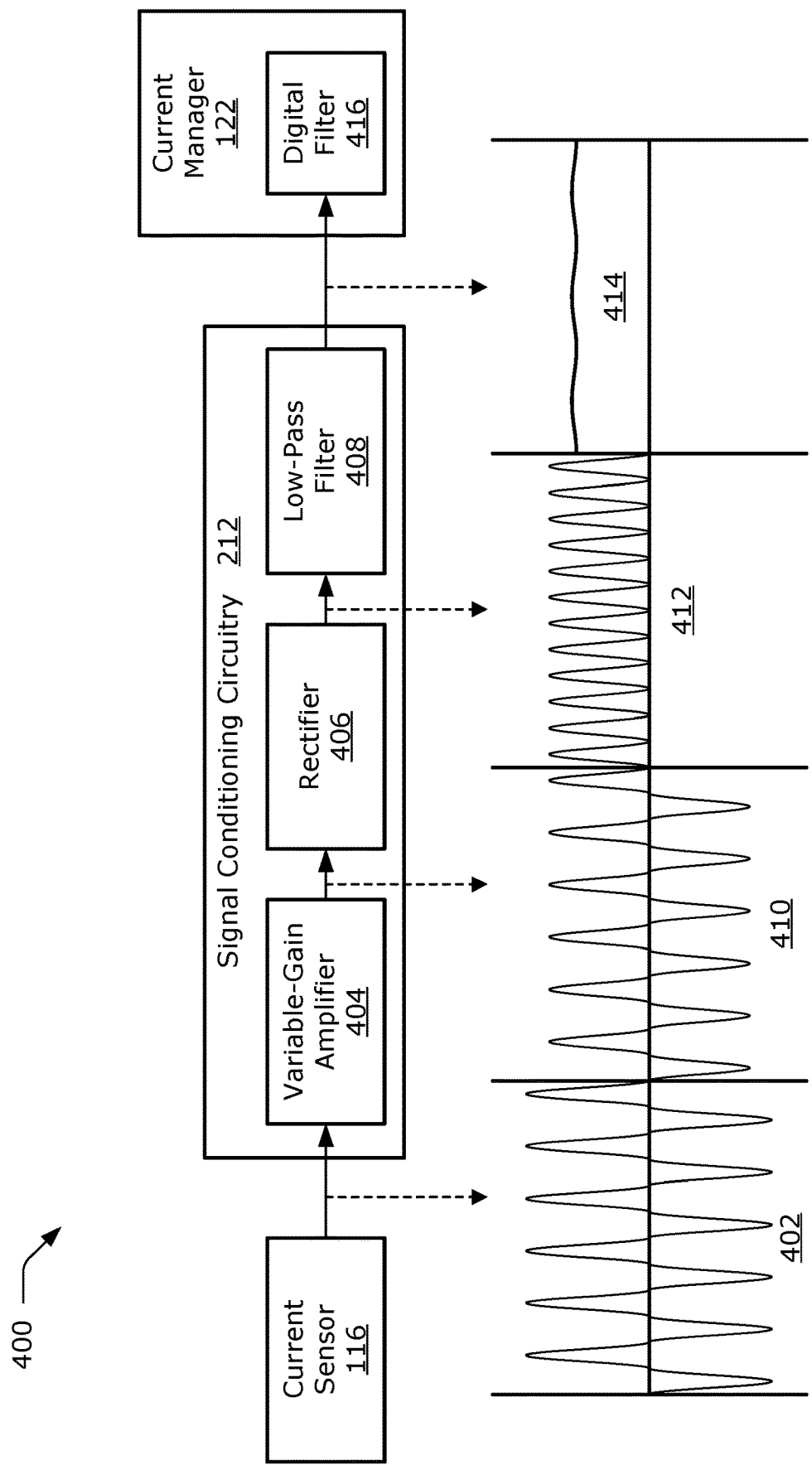
FIG. 4 illustrates an example configuration of signal conditioning circuitry in accordance with one or more aspects.

FIG. 4 illustrates an example configuration of signal conditioning circuitry in accordance with one or more aspects generally at 400. In this example, the signal conditioning circuitry 212 (conditioning circuitry 212) is shown coupled between a current sensor 116 and a current manager circuit 122, though the conditioning circuitry 212 may be integrated with either or other components of a base charging unit 110. Additionally, although shown in a particular configuration, order, or grouping, elements of the conditioning circuitry 212 may be reconfigured in a different order, without a particular element, or grouped with other components to condition a signal provided by the current sensor 116.

At shown at 402, an output of the current sensor 116 may include an AC signal that represents or corresponds to an amount of current flowing an a base resonant circuit or base coil. For example, the AC signal may represent an amplitude of the current scaled down by a turns ratio of the current sensor 116 and have a frequency of approximately 85 kHz. In some cases, the AC signal is generated or provided by a shunt resistor connected between outputs (e.g., differential outputs) of the current sensor 116, such as when the current sensor is implemented as a current sensing transformer. In other cases, the output signal of the current sensor 116 is a DC signal or single-ended signal that represents or corresponds to an amount of current flowing an a resonant circuit. Alternately or additionally, the current sensor 116 may provide a digital or bit-based representation of the current flowing in the base resonant circuit.

In this example, the output of the current sensor 116 is coupled or connected to an input of the conditioning circuitry 212, which can include a variable-gain amplifier 404, a rectifier 406, and a low-pass filter 408. The variable-gain amplifier 404 may be a programmable or dynamically configurable amplifier, such that an output signal of the current sensor 116 can be scaled based on a gain of the amplifier. In some cases, a gain of the variable-gain amplifier 404 is set or programmed based on an output range of the current sensor 116 (e.g., gain or turns ratio) to ensure that an output signal of the amplifier is correctly scaled for subsequent signal conditioning or signal processing. Alternately or additionally, the variable-gain amplifier 404 can be configured to remove an offset from or apply an offset to an output signal of the current sensor 116, such as to remove an signal offset introduced by the current sensor 116. As shown at 410, the variable-gain amplifier scales the AC signal (e.g., 85 kHz) output by the current sensor 116 for a next stage of signal conditioning.

The rectifier 406 may be implemented as any suitable type or configuration of rectifier, such as a passive diode-based rectifier or an active rectifier. In some cases, the rectifier 406 is implemented as an active rectifier with a pair of operational amplifiers (e.g., junction gate FET (JFET) op-amps) or other active devices. Generally, the rectifier 406 rectifies the AC signal generated by the current sensor 116 or variable-gain amplifier 404 to provide a DC signal as shown at 412. As such, the rectified signal at 412 may have a similar amplitude of the AC signal with twice the frequency.

The low-pass filter 408 of the conditioning circuitry 212 can filter the rectified or other signals to remove high frequency components of the filtered signal. The low-pass filter 408 may be implemented as any suitable type of low-pass filter, such as a passive low-pass filter (e.g., resistor-capacitor (RC) filter or resistor-inductor-capacitor (RLC) filter) or an active-low pass filter. In some cases, the low-pass filter 408 is implemented as an active low-pass filter with an operational amplifier (e.g., JFET op-amp) or other another active device. Generally, the low-pass filter 408 filters out frequency components of the DC filter related to inversion of the alternating current that flows in a base coil to provide a filtered DC signal as shown at 414. Here, note that the filtered DC signal may include low frequency signal components (e.g., 80 Hz to 140 Hz) that correspond ripple current of the measure alternating current. Alternately or additionally, an output of the conditioning circuitry 212 may include clamping diodes to protect an input of the current manager circuit 122 or an input of a digital device on which the current manager circuit 122 is embodied.

The current manager circuit 122 may use the DC signal or other signals provided by the conditioning circuitry 212 to measure or determine an amount of ripple current that flows in the base coil 206. In some cases, the current manager circuit 122 samples or measures the DC signal based on a PWM signal that drives the inverter 112, switching transitions of the inverter 112, and the like. In the example, the current manager circuit 122 also includes a digital filter 416, which may be used to filter an indication of the ripple current from the DC signal to provide an average value of a current envelope of the alternating current flowing in the base coil.

Techniques of Reducing Ripple Current for WEVC

The following techniques of ripple current reduction for WEVC may be implemented using any of the previously described elements of the example environment, components, or circuits. Reference to elements, such as the inverter 112-1, the inverter 112-2, current sensor 116, PWM generator 120, or current manager circuit 122, is made by example only and is not intended to limit the ways in which the techniques can be implemented.

The techniques are described with reference to example methods illustrated in FIGS. 5-7 and 9 which are depicted as respective sets of operations or acts that may be performed by entities described herein. The operations described may be performed using any suitable circuitry or component, which may provide means for implementing one or more of the operations. The depicted sets of operations illustrate a few of the many ways in which the techniques may be implemented. As such, operations of a method may be repeated, combined, separated, omitted, performed in alternate orders, performed concurrently, or used in conjunction other methods illustrated in FIGS. 5-7 and 9 or operations thereof.

FIG. 5 illustrates an example method 500 for adjusting a peak-to-peak amplitude of alternating current, including operations performed by the current manager circuit 122.

At 502, a periodic control signal is applied to an inverter. The periodic control signal may be used by the inverter to invert DC power to alternating current. In some cases, the PWM generator 120 applies a periodic control signal to the inverters 112-1 and 112-2 of the base charging unit 110. By so doing, the inverters 112-1 and 112-2 can be caused to invert DC power provided by the DC power source 108 at any suitable frequency (e.g., at least 20 kHz). The periodic control signal may be applied as one signal or as two separate signals, such as to drive respective pairs of H-bridge switching devices. For example, four separate periodic control signals or PWM signals can be applied to a dual full-bridge inverter for use in inverting two channels or two phases of alternating current. The alternating current of the inverter may be applied to a resonant circuit that is configured to wirelessly transmit power based on the alternating current.

At 504, an indication is received from a current sensor that indicates a peak-to-peak amplitude of alternating current. The alternating current may be the alternating current flowing between a tuning portion and a coil portion of the resonant circuit. In some cases, the current manager circuit 122 receives an indication from the current sensor 116 (or conditioning circuitry 212) that indicates an amplitude of peak-to-peak flowing to the base coil 206. In such cases, the indication may be a rectified signal or DC signal that indicates an amplitude of current ripple flowing between the tuning portion and coil portion of the resonant circuit.

Further, the indication or signal received from the current sensor may be sampled, based on transitions of the periodic control signal, to measure a peak-to-peak amplitude of the alternating current. By so doing, switching noise associated with inversion of the alternating current can be avoided to increase measurement accuracy. The measured peak-to-peak amplitude of the alternating current can then be compared with a predefined threshold for the peak-to-peak amplitude of the alternating current to determine if ripple current in the resonant circuit exceeds the predefined threshold.

At 506, the periodic control signal is altered, based on the indication, to adjust the peak-to-peak amplitude of the alternating current flowing between the tuning portion and the coil portion of the resonant circuit. In some cases, the current manager circuit 122 causes the PWM generator 120 to alter a duty-cycle of a PWM signal applied to the inverters 112-1 and 112-2. Altering the duty-cycle of the PWM signal can be effective to reduce on-times of switching devices of the inverters 112-1 and 112-2 proximate peaks in DC ripple voltage, and thus may reduce ripple current in the resonant circuit. By reducing ripple current in the resonant circuit of a wireless power transmitter, corresponding ripple current may also be reduced at a wireless power receiver. By so doing, ripple current in circuits of the wireless power receiver can be reduced to protect batteries or other current-sensitive components of the wireless power receiver.

Figure 6:
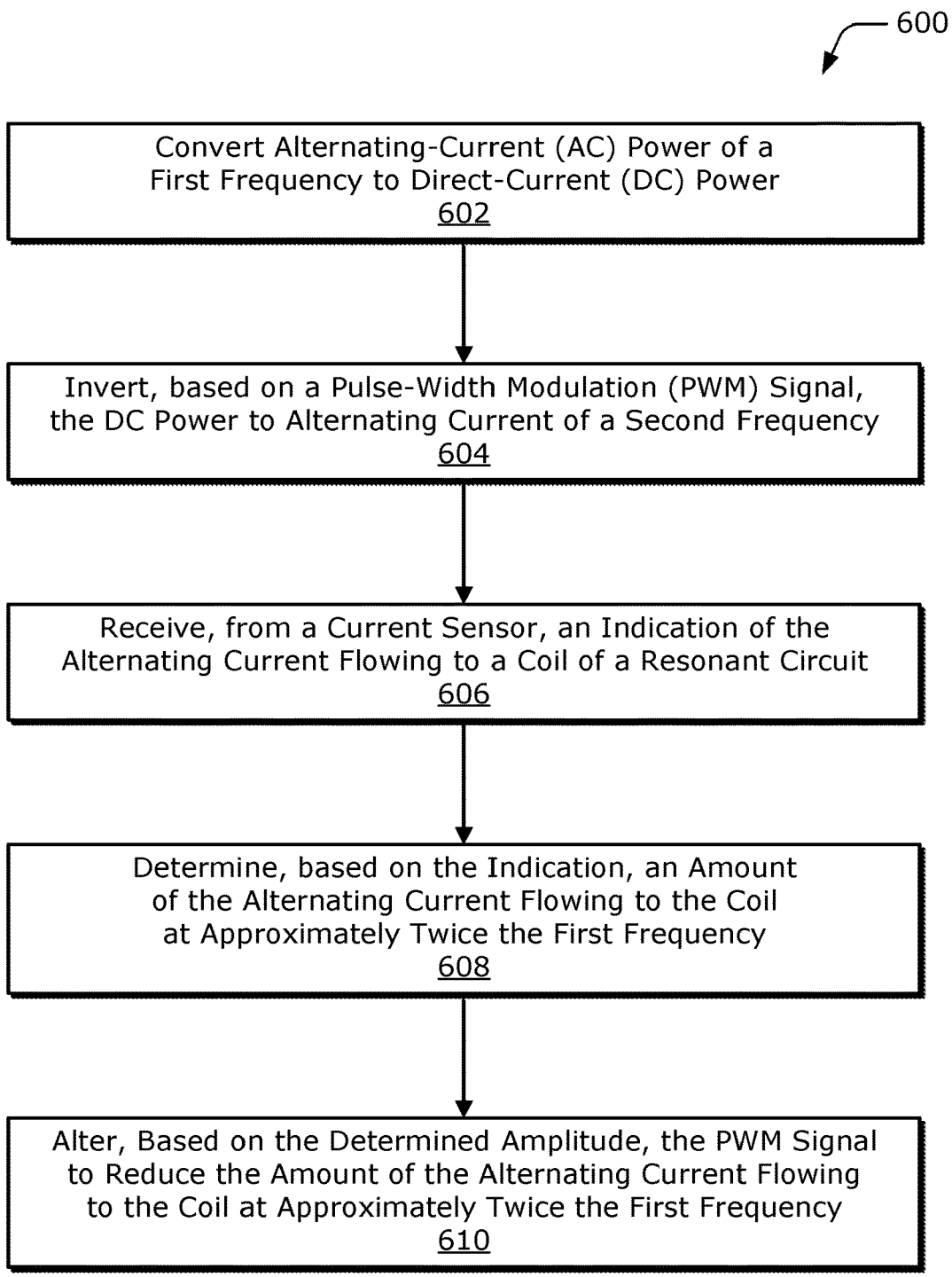
FIG. 6 illustrates an example method for altering a pulse-width modulation (PWM) signal to reduce a frequency component of alternating current that flows to a coil of a resonant circuit.

FIG. 6 illustrates an example method 600 for altering a PWM signal to reduce a frequency component of alternating current that flows to a coil, including operations performed by the current manager circuit 122.

At 602, AC power of a first frequency is converted to DC power. For example, the DC power source 108 of the wireless power transmitter 102 may convert mains AC power of 50 Hz or 60 Hz to DC power. In some cases, rectification of low frequency mains AC voltage results in ripple voltage on the DC power. In such cases, the ripple voltage may have a frequency that is a multiple of the AC source voltage, such as from 100 Hz to 400 Hz (e.g. for 3-phase systems).

At 604, the DC power is inverted to alternating current of a second frequency based on a PWM signal. In some cases, the inverters 112-1 and 112-2 invert the DC power based on a PWM signal generated by the PWM generator 120 to alternating current of approximately 85 kHz. The alternating current may be sent to a DC blocking component to remove DC components or an offset of the AC power. Alternately or additionally, the alternating current may be transmitted or applied to a coil switch for direction or phase control.

At 606, an indication of current flowing to a coil of a resonant circuit is received from a current sensor. For example, the current manager circuit 122 may receive, from the current sensor 116, an indication of the alternating current flowing from the base tuning circuit 204 to the base coil 206 of the base resonant circuit 114. In some cases, the indication includes a DC signal that is rectified or filtered to remove frequency components associated with inversion of the alternating current (e.g., at least 10 kHz). Alternately or additionally, the indication may be sampled to provide a digital representation of an amplitude of the alternating current.

At 608, an amount of the alternating current flowing to the coil at approximately twice the first frequency is determined based on the indication. In some cases, the current manager circuit 122 determines an amount of the alternating current flowing to the base coil 206 based on the indication received from the current sensor 116. As noted, the indication may include a DC signal or filtered signal from which high frequency components are removed. As such, an amplitude of current flowing to the coil at approximately 100 Hz or 120 Hz (e.g., an amount of ripple current) may be determined based on the DC signal or filtered signal received from the current sensor or signal conditioning circuitry associated with the current sensor.

At 610, the PWM signal is altered, based on the determined amplitude, to reduce the amount of the alternating current flowing to the coil at approximately twice the first frequency. In some cases, the current manager circuit 122 alters the PWM signal used by the inverters 112-1 and 112-2 to invert the DC power to reduce an amount of alternating current flowing to the base coil 206 at approximately 100 Hz or 120 Hz. This can be effective to reduce ripple current in the coil of the resonant circuit, and thus an amount of corresponding ripple current in a coil of a wireless power receiver to which power is being transferred.

Figure 7:
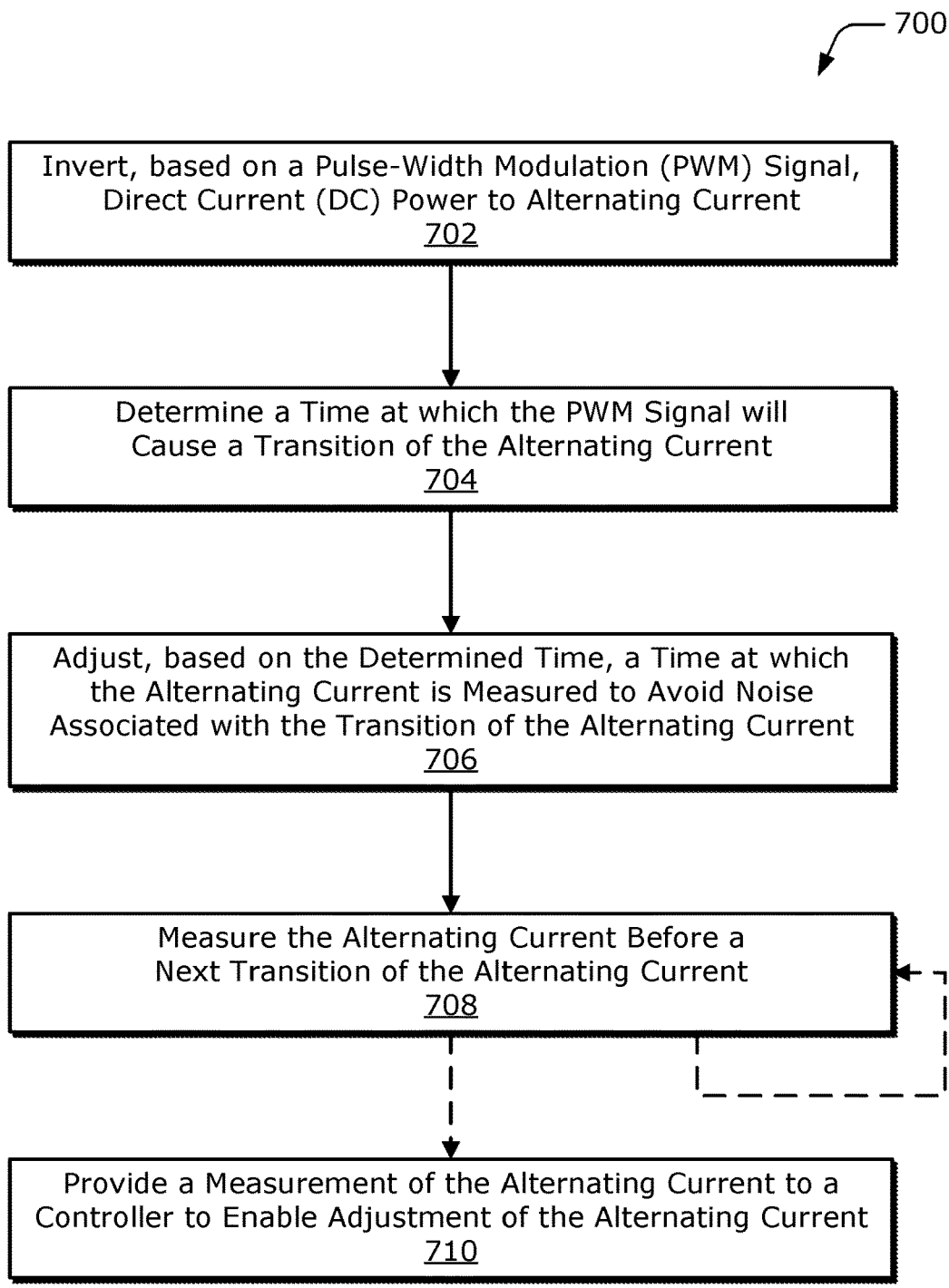
FIG. 7 illustrates an example method for measuring characteristics of alternating current based on a transition of a PWM signal.

FIG. 7 illustrates an example method 700 for measuring characteristics of alternating current based on a transition of a PWM signal, including operations performed by the current manager circuit 122.

At 702, DC power is inverted to alternating current based on a PWM signal. For example, the inverters 112-1 and 112-2 can invert the DC power based on PWM signals generated by the PWM generator 120 to alternating current of approximately 85 kHz. In some cases, the inverter 112 inverts DC power to provide multiple tracks or phases of alternating current, to extend the possible current variation range of the inverter. Alternately or additionally, the inverter voltages may be summed to form a composite signal, which can be used to drive both coils of a dual coil resonant circuit.

Figure 8:
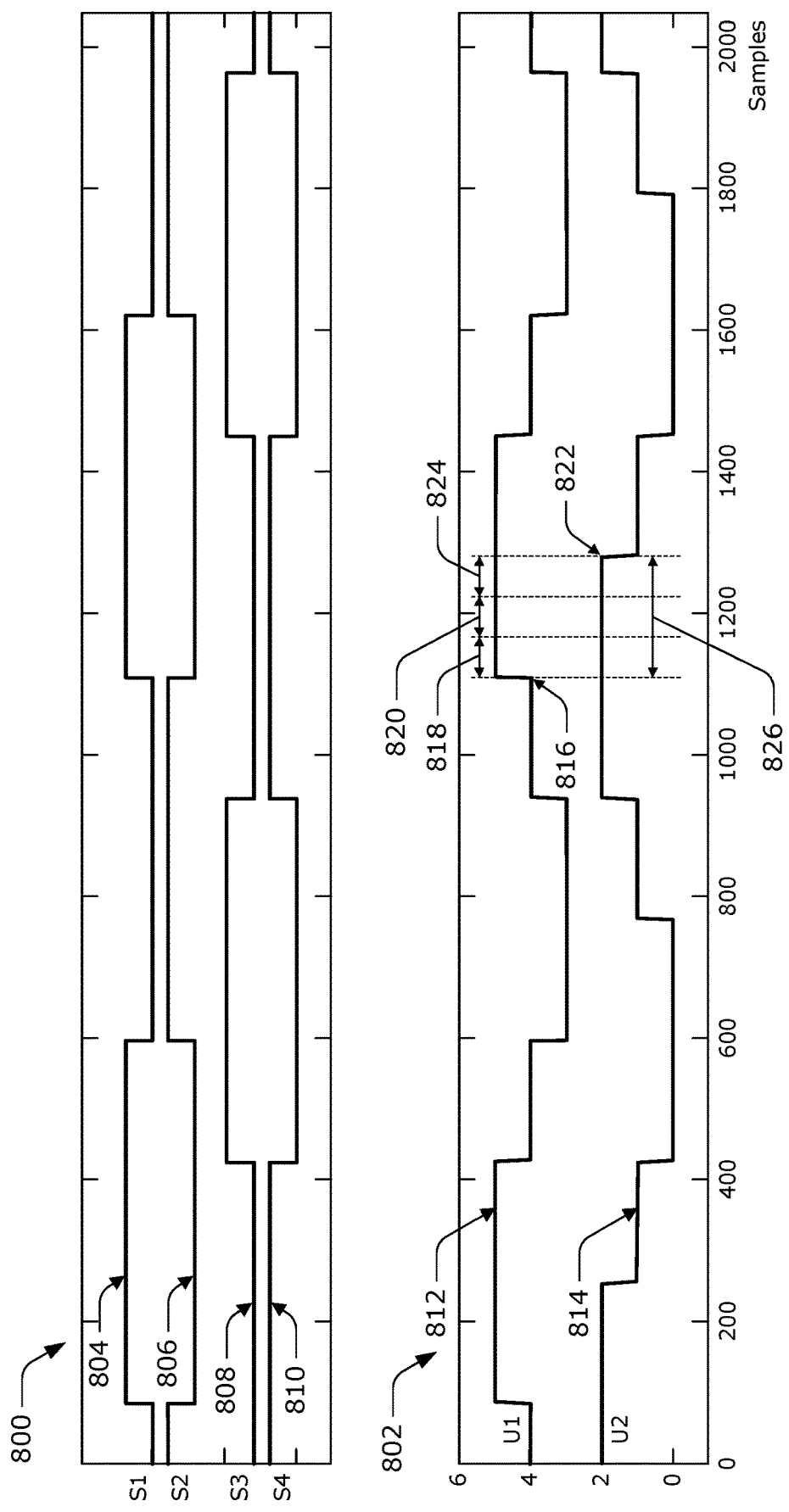
FIG. 8 illustrates example PWM waveforms useful to control switches of an inverter to provide alternating current.

By way of example, consider FIG. 8 in which PWM drive signals for a bi-polar coil system are shown at 800 and inverter bridge output voltages are shown at 802. In the context of switch devices shown in FIG. 3, a first PWM signal 804 can be used to control switch device S1 of the inverter 112-1 and a second PWM signal 806 can be used to control switch device S2 of the inverter 112-1. The switch devices S1 and S2 (or S3 and S4) of the inverter 112-1 may be referred to as complimentary switches or switch devices. Similarly, a third PWM signal 808 can be used to control switch device S3 of the inverter 112-1 and a fourth PWM signal 810 can be used to control switch device S2 of the inverter 112-1. Although not shown, respective PWM drive or control signals for the second H-bridge of the inverter 112-2 can be implemented in a similar manner.

In the context of FIG. 8, the PWM drive signals shown at 800 can be used to control the switch devices S1 through S4 of the inverter 112-1 to generate an output voltage waveform 812 at the output of the inverter 112-1 (e.g., U1). Similarly, another set of PWM drive signals (not shown), may be used to control the switch devices S5 through S8 of the other inverter 112-2 to generate an output voltage waveform 814. Here, the inverter output voltage waveforms 812 and 814 may be summed to form a composite signal for driving base coils 310-1 and 310-2 of the base resonant circuit 114.

At 704, a time at which the PWM signal will cause a transition of the alternating current is determined. In some cases, the current manager circuit 122 receives an indication or replica PWM signal from the PWM generator 120 from which a time of transition can be determined. As such, the current manager circuit 122 may determine when one or more channels of alternating current will begin to transition responsive to switch device activity in an H-bridge of the inverter 112. In the context of the present example, the current manager circuit 122 determines that the first bridge of the inverter 112-1 will begin to transition at time 816, when a pair of switch devices (e.g., S1, S4) are activated to cause current to flow from the DC power source 108 to the base resonant circuit 114.

At 706, a time at which the alternating current is measured is adjusted based on the determined time of the transition in alternating current. For example, the current manager circuit 122 may advance or delay sampling of a signal provided by the current sensor 116 or conditioning circuitry 212 based on the transition time of the PWM signal. Continuing the present example, the current manager circuit 122 delays sampling of signals provided by the current sensor 116 for duration of time 818 that corresponds to noise or ringing generated by switch transitions of the inverter 112-1. The duration of time 818 may be predefined or dynamically configured based on switch noise generated by the inverter 112. In this case, the duration of time 818 is set to approximately 500 nanoseconds to avoid or minimize the sampling of switch noise associated with switch transition at time 816.

At 708, the alternating current is measured before a next transition of the alternating current. In some cases, the current manager circuit 122 samples the signal provided by the current sensor 116 or conditioning circuitry 212 before a next transition of the PWM signal generated by the PWM generator 120. In the context of the present example, the current manager circuit 122 samples, via an analog-to-digital input, a first signal provided by the current sensor 116 during sampling window 820. The sampling window 820 (e.g., 500 nanoseconds) may be determined to occur between the switching transition at time 816 and a next switch transition of the second H-bridge of the inverter 112-2 at time 822. In this example, the first signal provided by the current sensor 116 corresponds to a first channel of the alternating current for the bi-polar coil system.

From operation 708, the method 700 may proceed to operation 710 or repeat operation 708 to make another measurement. By repeating operation 708 another measurement of the alternating current may be performed before the next transition of the alternating current. Alternately, a measurement of other alternating current may be performed before the next transition of the alternating current. For example, in a dual coil or bi-polar wireless transmitter, a second measurement of alternating current flowing into a second coil may be performed before the next transition of either track of alternating current occurs. Continuing the ongoing example, the current manager circuit 122 samples, via another analog-to-digital input, a second signal provided by the current sensor 116 during sampling window 824 (e.g., 500 nanoseconds). This may enable the current manager circuit 122 to sample both channels of the alternating current before the next switch transition of the second H-bridge of the inverter 112-2 is scheduled to occur at time 822 and within a transition time window 826 (e.g., 1500 nanoseconds) between switch transitions.

At 710, a measurement of the alternating current is provided to a controller to enable adjustment of the alternating current. For example, an analog-to-digital sampling block or digital filter 416 can provide the measurement of the alternating current to the current manager circuit 122. The current manager circuit 122 can then compare the measurement of the alternating current to a predefined threshold to determine whether to adjust an amplitude of the alternating current. Concluding the present example, the analog-to-digital inputs provide the measurements of the first and second channels of alternating current to the current manager circuit 122 to enable adjustment of either or both channels of the alternating current. By so doing, the current manager circuit 122 can manage or reduce ripple current in either or both base coils of the bi-polar coil system, depending on the coil mode.

Figure 9:
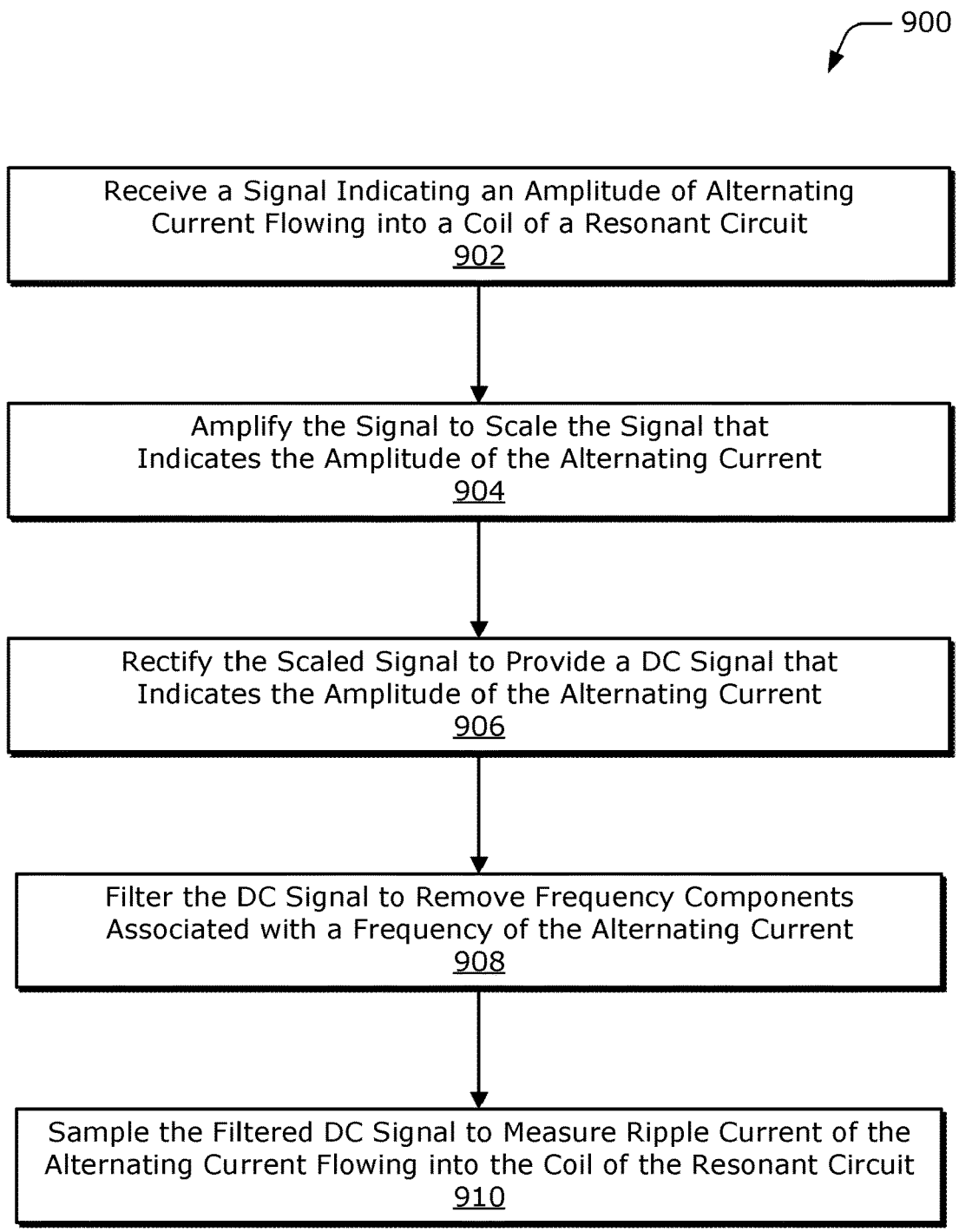
FIG. 9 illustrates an example method for conditioning a signal that indicates an amplitude of alternating current.

FIG. 9 illustrates an example method 900 for conditioning a signal that indicates an amplitude of alternating current, including operations performed by the current manager circuit 122.

At 902, a signal is received that indicates an amplitude of alternating current flowing into a coil of a resonant circuit. In some cases, a current manager circuit 122 receives a signal from a current sensor 116 or conditioning circuitry 212 that indicates an amplitude of alternating current flowing into a base coil 206. The signal may be an AC signal or differential signal provided by a current sensing transformer coupled between a tuning portion and a coil portion of the resonant circuit. Alternately, the signal may be a DC signal or single-ended signal received from a current sensing transducer coupled between the tuning portion and the coil portion of the resonant circuit.

At 904, the signal is amplified to scale the signal that indicates the amplitude of the alternating current. For example, a variable-gain amplifier 404 of the conditioning circuitry 212 may amplify the signal to provide a scaled signal that indicates the amplitude of the alternating current. A gain of an amplifier may be set or configured based on an output range of a current sensor or an input range of a digital circuit to which the scaled signal is transmitted. Alternately or additionally, a current manager circuit of a base charging unit may configure the amplifier based on data provided by a calibration procedure or power-on test.

At 906, the scaled signal is rectified to provide a DC signal that indicates the amplitude of the alternating current. In some cases, the rectifier 406 of the conditioning circuitry 212 rectifies the scaled signal to provide a DC signal that indicates the amplitude of the alternating current. The rectified signal may have a similar amplitude to that of the scaled signal and a frequency of approximately twice that of the scaled signal. Alternately, rectification of the signal may be bypassed for single-ended or DC signals received from a current sensor.

At 908, the DC signal is filtered to remove frequency components associated with a frequency of the alternating current. For example, the low-pass filter 408 of the conditioning circuitry 212 may filter the DC signal to remove high frequency components that correspond to an operating frequency of the inverter 112. In some cases, the low-pass filter is configured with a cut-off frequency based on a frequency of inverter operation or a frequency of ripple current. In such cases, the DC signal can be filtered with a cut-off frequency of approximately 1 Hz to 10 kHz.

At 910, the filtered DC signal is sampled to measure ripple current of the alternating current flowing into the coil of the resonant circuit. In some cases, the current manager circuit 122 samples the filtered DC signal via an analog-to-digital input to measure the alternating current or ripple current of the alternating current. Alternately or additionally, the filtered DC signal can be digitally filtered with a lower cut-off frequency (e.g., 10 Hz) to determine an average value or RMS value of the alternating current flowing in the base resonant circuit.

Charge Control System

Figure 10:
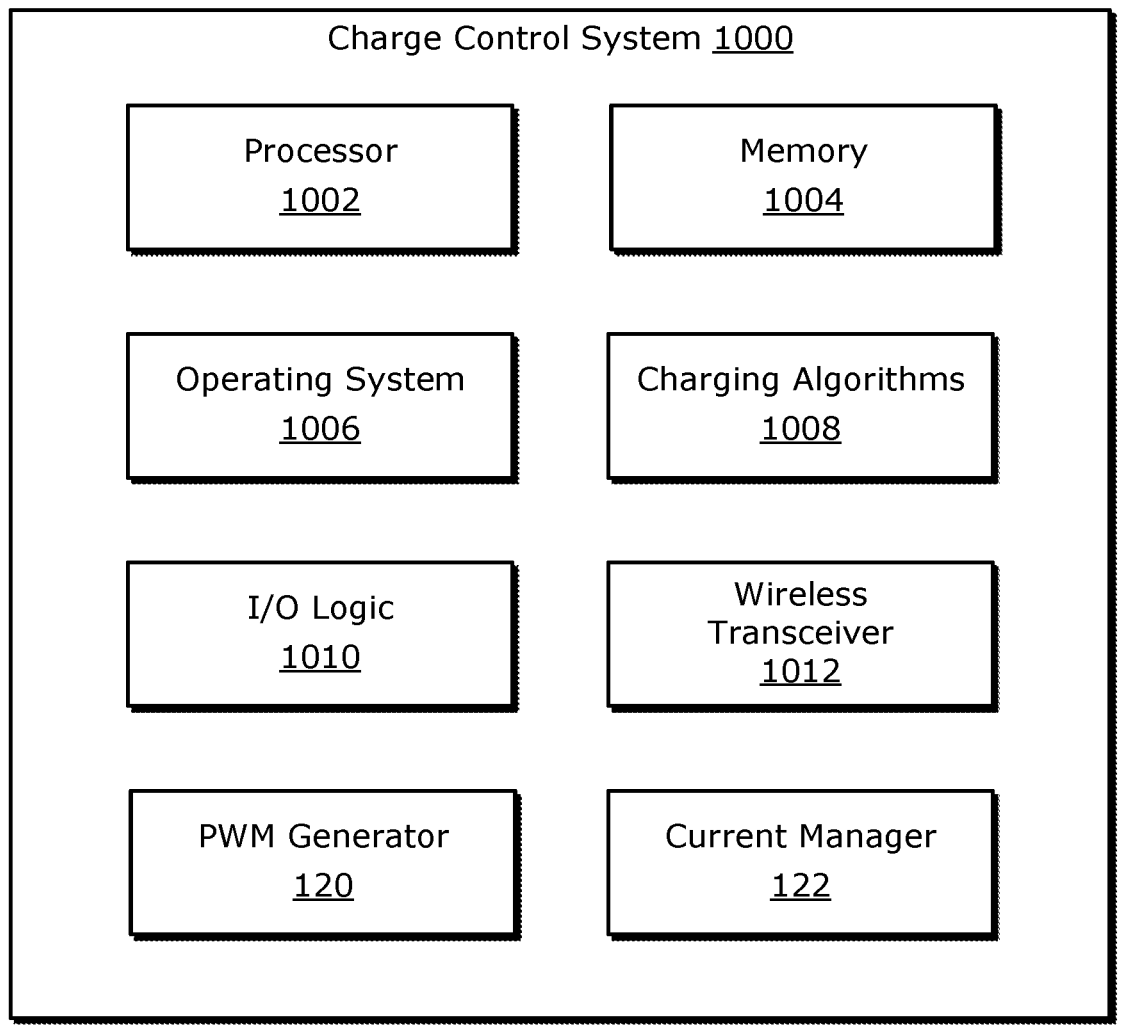
FIG. 10 illustrates an example charge control system capable of implementing aspects of ripple current reduction.

FIG. 10 illustrates an example charge control system 1000, which includes components capable of implementing aspects of ripple current reduction for WEVC. Entities of the charge control system 1000 may be implemented in combination or separately in any suitable structure, such as a system-on-chip (SoC), application specific integrated-circuit (ASIC), power management IC (PMIC), printed circuit board assembly (PCBA), embedded system, and the like. For example, the charge control system 1000 can be implemented as a PCBA of a base charging unit that include a power input node for DC power and power output nodes to one or more coils configured to transmit power. The charge control system 1000 may also be implemented as, or in, any suitable charging or power transfer device, such as a WEVC system, base charging unit, transmitter pad, power inverter, power converter, inductive power transfer (IPT) device, wireless power transmitter, induction-based appliance, or any other device that may implement wireless power transfer.

The charge control system 1000 may be integrated with a microprocessor, storage media, I/O logic, data interfaces, logic gates, a power transmitter, a power receiver, circuitry, firmware, software, or combinations thereof to provide communicative, control, or processing functionalities. The charge control system 1000 may include a data bus (e.g., control area network bus (CAN-bus), inter-integrated circuit ($I^2C$) bus) enabling communication between the various components of the charge control system 1000 and other components of a wireless charging system. In some aspects, the charge control system 1000 may communicate with a wireless power receiver or a controller thereof to implement aspects of ripple current reduction.

In this particular example, the charge control system 1000 includes a processor 1002 and memory 1004. The memory 1004 may include any suitable type of memory, such as volatile memory (e.g., DRAM), non-volatile memory (e.g., Flash), and the like. The memory 1004 is implemented as a storage medium, and thus do not include transitory propagating signals or carrier waves. The memory 1004 can store data and processor-executable instructions of the charge control system 1000, such as an operating system 1006 of the system and charging algorithms 1008. The charging algorithms 1008 may include various charging profiles and tuning parameters to enable interoperability between the charge control system 1000 and multiple types or sizes of wireless power receivers. Generally, the processor 1002 executes the operating system 1006 and charging algorithms 1008 from the memory 1004 to implement various functions of a wireless charging system (e.g., WEVC system) associated with the charge control system 1000.

The charge control system 1000 may also include I/O logic 1010 and a wireless transceiver 1012. The I/O logic 1010 can be configured to provide a variety of I/O ports or data interfaces to enable communication with other components of a wireless charging system, such as a DC power supply, sensors (e.g., alignment or proximity sensors), power transmitting device, or power receiving device. The wireless transceiver 1012 may also enable communication with other components of the wireless charging system or a control system of a wireless power receiver. For example, the charge control system 1000 may communicate with a charge controller of an electric vehicle (EV) to determine a rating or configuration of the EVs wireless charging system and receiver coil.

The charge control system 1000 also includes a PWM generator 120 and current manager circuit 122, which may be implemented similarly to or differently from the entities described with reference to FIG. 1. PWM generator 120 and current manager circuit 122 can be embodied separately or combined with other components of the charge control system 1000. For example, the current manager circuit 122 may be integrated with or have access to various charging algorithms 1008 that describe ripple current specifications or limits for respective power-receiving devices. The current manager circuit 122, either independently or in combination with other components, can be implemented as processor-executable instructions stored in the memory 1004 and executed by the processor 1002 to implement ripple current reduction or operations described herein. Alternately or additionally, the current manager circuit 122 and other components of charge control system 1000 may be implemented as hardware, fixed-logic circuitry, firmware, or a combination thereof that is implemented in association with I/O logic 1010 or other signal processing circuitry of the charge control system.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for wireless power transmission comprising:
   a power input node configured to receive direct-current (DC) power;
   an inverter circuit having an input coupled to the power input node;
   a resonant circuit coupled to outputs of the inverter circuit, the resonant circuit including a tuning portion and a coil portion;
   a current sensor coupled to the resonant circuit; and
   a controller coupled to the inverter circuit and the current sensor, the controller configured to:
   apply, to the inverter circuit, a periodic control signal for use by the inverter circuit to invert the DC power to alternating current;
   receive, from the current sensor, an indication of a peak-to-peak amplitude of the alternating current that flows to the coil portion of the resonant circuit; and
   alter, based on the indication, the periodic control signal to adjust the peak-to-peak amplitude of the alternating current that flows between the tuning portion and the coil portion of the resonant circuit.

2. The apparatus as recited in claim 1, wherein altering the periodic control signal to adjust the peak-to-peak amplitude of the alternating current is effective to reduce the peak-to-peak amplitude of the alternating current.

3. The apparatus as recited in claim 1, wherein:
   the peak-to-peak amplitude of the alternating current that flows into the coil portion of the resonant circuit corresponds to ripple current; and
   altering the periodic control signal is effective to reduce an amplitude of the ripple current that flows into the coil portion of the resonant circuit.

4. The apparatus as recited in claim 1, wherein the controller is further configured to:
   sample, based on the periodic control signal, the indication of the peak-to-peak amplitude to measure the peak-to-peak amplitude of the alternating current;
   compare the measured peak-to-peak amplitude of the alternating current with a predefined threshold for the peak-to-peak amplitude of the alternating current; and
   alter, responsive to the measured peak-to-peak amplitude exceeding the predefined threshold, the periodic control signal to reduce the measured peak-to-peak amplitude of the alternating current below the predefined threshold.

5. The apparatus as recited in claim 1, wherein:
   applying the periodic control signal to the inverter circuit causes the inverter circuit to invert the DC power to the alternating current at a first frequency;
   the peak-to-peak amplitude of the alternating current corresponds to a second frequency; and
   the second frequency to which the peak-to-peak amplitude corresponds is different from the first frequency at which the alternating current is inverted.

6. The apparatus as recited in claim 5, wherein:
   the first frequency at which the inverter circuit inverts the alternating current is greater than 20 kHz; and
   the second frequency to which the peak-to-peak amplitude corresponds is less than 400 Hz.

7. The apparatus as recited in claim 1, further comprising a DC blocking circuit coupled between the outputs of the inverter circuit and the resonant circuit of the apparatus.

8. The apparatus as recited in claim 1, further comprising a coil switch circuit coupled between the outputs of the inverter circuit and the resonant circuit of the apparatus.

9. The apparatus as recited in claim 1, further comprising signal conditioning circuitry coupled between an input the controller and an output of the current sensor of the apparatus, the signal conditioning circuitry including at least one of an amplifier, a rectifier, or a low-pass filter.

10. The apparatus as recited in claim 9, wherein the signal conditioning circuitry includes the amplifier, the rectifier, and the low-pass filter.

11. A system for wirelessly transmitting power comprising:
a direct-current (DC) power source configured to convert alternating-current (AC) power of a first frequency to DC power;
an inverter circuit coupled to the DC power source, the inverter circuit configured to invert, based on a pulse-width modulation (PWM) control signal, the DC power to alternating current of a second frequency that is different from the first frequency;
a resonant circuit coupled to the inverter circuit, the resonant circuit including a tuning portion and a coil configured to wirelessly transmit, based on the alternating current, power to another resonant circuit of a power-receiving device;
a current sensor coupled to the resonant circuit; and
a controller configured to:
receive, from the current sensor, an indication of the alternating current flowing to the coil of the resonant circuit;
determine, based on the indication, an amount of the alternating current flowing to the coil at a third frequency, the third frequency being less than one half of the second frequency; and
alter, based on the determined amplitude, the PWM signal of the inverter circuit to reduce the amount of the alternating current flowing to the coil at the third frequency.

12. The system as recited in claim 11, wherein the third frequency at which the amount of alternating current flows to the coil is approximately twice the first frequency of the AC power.

13. The system as recited in claim 11, wherein the controller is further configured to measure, based on the PWM control signal, an amplitude of the indication to determine the amount of the alternating current flowing to the coil at the third frequency.

14. The system as recited in claim 13, wherein measuring the amplitude of the indication includes determining a time at which to measure the amplitude of the indication based on a transition of the PWM control signal.

15. The system as recited in claim 11, wherein the alternating current flowing to the coil of the resonant circuit at the third frequency is ripple current of the DC power of the DC power source.

16. The system as recited in claim 11, further comprising signal conditioning circuitry coupled between the current sensor and the controller of the system.

17. The system as recited in claim 16, wherein the signal conditioning circuitry includes at least one of an amplifier, a rectifier, or a low-pass filter.

18. The system as recited in claim 16, wherein the signal conditioning circuitry includes at least one of a variable-gain amplifier, an active rectifier, or an active low-pass filter.

19. The system as recited in claim 11, wherein:
the first frequency of the AC power is less than 100 Hz;
the second frequency of the alternating current provided by the inverter circuit is greater than 60 kHz; and
the third frequency at which the alternating current flows into the coil is less than 30 kHz.

20. The system as recited in claim 11, wherein the system is implemented as part of a wireless electric vehicle charging (WEVC) system, a bi-polar WEVC system; or a dual coil WEVC system.

21. A method for wireless power transmission comprising:
receiving direct-current (DC) power;
applying, to an inverter circuit, a periodic control signal used by the inverter circuit to invert the DC power to provide alternating current;
applying the alternating current provided by the inverter circuit to a resonant circuit that includes a tuning portion and a coil portion;
receiving, from a current sensor, an indication of peak-to-peak amplitude of the alternating current flowing to the coil portion of the resonant circuit; and
altering, based on the indication, the periodic control signal to adjust the peak-to-peak amplitude of the alternating current flowing to the coil portion of the resonant circuit.

22. The method as recited in claim 21, wherein the periodic control signal is a pulse-width modulation (PWM) control signal and altering the periodic control signal includes altering a duty-cycle of the PWM control signal.

23. The method as recited in claim 21, further comprising:
determining, based on the periodic control signal, a time at which to sample the peak-to-peak amplitude of the alternating current;
sampling, at the determined time, the indication of the peak-to-peak amplitude of the alternating current to provide a sample of the indication;
altering, based on the sample of the indication, the periodic control signal to adjust the peak-to-peak amplitude of the alternating current flowing to the coil portion of the resonant circuit.

24. The method as recited in claim 23, further comprising:
comparing the sample of the indication with a predefined threshold for the peak-to-peak amplitude of the alternating current; and
altering, responsive to the sample of the indication exceeding the predefined threshold, the periodic control signal to reduce the peak-to-peak amplitude of the alternating current.

25. The method as recited in claim 23, wherein the indication of the peak-to-peak amplitude of the alternating current is an analog signal and the method further comprises at least one of:
amplifying the analog signal prior to the sampling;
rectifying the analog signal prior to the sampling; or
filtering the analog signal prior to the sampling.

26. The method as recited in claim 21, wherein:
applying the periodic control signal to the inverter circuit causes the inverter circuit to invert the DC power to the alternating current at a first frequency;
the peak-to-peak amplitude of the alternating current corresponds to a second frequency; and
the second frequency to which the peak-to-peak amplitude corresponds is different from the first frequency at which the alternating current is inverted.

27. An apparatus for wireless power transmission comprising:
a power input node configured to receive direct-current (DC) power;
an inverter circuit having an input coupled to the power input node;

a resonant circuit coupled to outputs of the inverter circuit, the resonant circuit including a tuning portion and a coil portion;

means for applying, to the inverter circuit, a periodic control signal for use by the inverter circuit to invert the DC power to alternating current;

means for sensing the alternating current that flows to the coil portion of the resonant circuit;

means for determining, based on the sensed alternating current, a peak-to-peak amplitude of the alternating current that flows to the coil portion of the resonant circuit; and means for altering, based on the peak-to-peak amplitude of the alternating current, the periodic control signal to adjust the peak-to-peak amplitude of the alternating current that flows to the coil portion of the resonant circuit.

28. The apparatus as recited in claim 27, wherein the periodic control signal is a pulse-width modulation (PWM) control signal, and the apparatus further includes:

means for generating the PWM control signal; and means for altering a duty-cycle of the PWM control signal.

29. The apparatus as recited in claim 27, further comprising means for sampling, based on the periodic control signal, an indication of the alternating current provided by the means for sensing the alternating current.

30. The apparatus as recited in claim 27, wherein the means for determining the peak-to-peak amplitude of the alternating current further comprise at least one of:

means for amplifying a signal indicative of the peak-to-peak amplitude;

means for rectifying the signal indicative of the peak-to-peak amplitude;

means for filtering the signal indicative of the peak-to-peak amplitude; or means for converting the signal indicative of the peak-to-peak amplitude to a digital representation.

* * * * *